US012779985B2

(12) United States Patent
Kvist et al.

(10) Patent No.: US 12,779,985 B2
(45) Date of Patent: Nov. 3, 2026

(54) GAS CONSUMER SYSTEM FOR A VEHICLE

(71) Applicant: VOLVO CONSTRUCTION EQUIPMENT AB, Eskilstuna (SE)

(72) Inventors: Roland Kvist, Braås (SE); Gordon Ekman, Moheda (SE); Kim Örkenrud, Växjö (SE)

(73) Assignee: VOLVO CONSTRUCTION EQUIPMENT AB, Eskilstuna (CH)

( * ) Notice: Subject to any disclaimer, the term of this patent is extended or adjusted under 35 U.S.C. 154(b) by 78 days.

(21) Appl. No.: 18/200,895

(22) Filed: May 23, 2023

(65) Prior Publication Data

US 2023/0391185 A1 Dec. 7, 2023

(30) Foreign Application Priority Data

Jun. 7, 2022 (EP) .................................... 22177448

(51) Int. Cl.
*B60K 15/03* (2006.01)
*B60K 15/01* (2006.01)
(Continued)

(52) U.S. Cl.
CPC ............ *B60K 15/013* (2013.01); *B60K 15/03* (2013.01); *F17C 7/00* (2013.01);
(Continued)

(58) Field of Classification Search
CPC .......... F17C 2260/037; F17C 2260/042; F17C 13/12; F17C 2270/0184; B60K 2015/0331; B60K 2015/0321; B60K 2015/0338
See application file for complete search history.

(56) References Cited

U.S. PATENT DOCUMENTS 3,886,885 A 6/1975 Becker et al.
11,236,864 B1 * 2/2022 Ewan ........................ F17D 1/02
(Continued)

FOREIGN PATENT DOCUMENTS

CN 112687925 A 4/2021
CN 112687934 A 4/2021
(Continued)

OTHER PUBLICATIONS

Extended European Search Report, European Application No. 22177448.2, mailed Nov. 18, 2022, 8 pages.
(Continued)

*Primary Examiner* — Nathaniel E Wiehe
*Assistant Examiner* — Daniel S Collins
(74) *Attorney, Agent, or Firm* — Sage Patent Group

(57) ABSTRACT

The present disclosure relates to a gas consumer system for a vehicle, the gas consumer system being configured to generate power by consuming gas, the gas consumer system comprising a gas consumer comprising an inlet configured to receive a flow of gas, at least one gas tank, the gas tank comprising a gas tank outlet, a conduit connecting the gas tank outlet of the tank to the inlet of the gas consumer, and an elongated sleeve attached to the inlet of the gas consumer and to the gas tank outlet of the gas tank, wherein the conduit is housed within the elongated sleeve, the elongated sleeve comprising a sleeve outlet configured to convey leakage of gas between the gas consumer and the gas tank away from the gas consumer system.

8 Claims, 4 Drawing Sheets

(51) Int. Cl.
*F17C 7/00* (2006.01)
*B60K 15/063* (2006.01)

(52) U.S. Cl.
CPC ............... *B60K 2015/03026* (2013.01); *B60K 2015/03144* (2013.01); *B60K 2015/0319* (2013.01); *B60K 2015/0321* (2013.01); *B60K 2015/03315* (2013.01); *B60K 2015/0638* (2013.01); *B60K 2015/0639* (2013.01)

(56) References Cited

U.S. PATENT DOCUMENTS

| | | | |
|---|---|---|---|
| 2012/0002131 | A1 | 1/2012 | Shigeki et al. |
| 2022/0001697 | A1 | 1/2022 | Mori |

FOREIGN PATENT DOCUMENTS

| | | | | |
|---|---|---|---|---|
| CN | 113757551 | A | * | 12/2021 |
| CN | 215985035 | U | | 3/2022 |
| DE | 102013226913 | A1 | | 6/2015 |
| DE | 102020119676 | A1 | | 1/2022 |
| JP | 2007106262 | A | | 4/2007 |
| WO | 2020060417 | A1 | | 3/2020 |

OTHER PUBLICATIONS

Chinese Office Action, Chinese Patent Application No. 202310646656, mailed Feb. 5, 2026, 2 pages.

* cited by examiner

GAS CONSUMER SYSTEM FOR A VEHICLE

CROSS REFERENCE TO RELATED APPLICATIONS

This application claims priority to European Patent Application No. 22177448.2, filed on Jun. 7, 2022, the disclosure and content of which is incorporated by reference herein in its entirety.

TECHNICAL FIELD

The present disclosure relates to a gas consumer system for a vehicle. The present disclosure also relates to a method of controlling a gas consumer system. Although the disclosed subject matter will mainly be directed to a gas consumer system comprising a fuel cell as a gas consumer, it should be readily understood that other gas consumers operable by a hydrogen gas. Also, the present disclosure will be described in relation to a working machine in the form of an articulated haulers, but the disclosure should be understood as applicable for other working machines and other types of vehicles as well.

BACKGROUND

The propulsion systems of vehicles are continuously developed to meet the demands from the market. A particular aspect relates to the emission of environmentally harmful exhaust gas. Therefore, vehicles are developed to use an alternative propulsion fuel compared to a conventional internal combustion engine propelled by diesel or petrol. Hydrogen fuel is one conceivable alternative, either for supply to a fuel cell, where the fuel cell generates electric power fed to a battery or directly to an electric traction motor, or supply to a hydrogen internal combustion engine using hydrogen fuel for its propulsion. The hydrogen gas is provided in one or more hydrogen gas tanks and fed to the hydrogen gas consumer via conduits. However, leakage from the hydrogen gas tanks to the hydrogen gas consumer can result in a severe collection of ignitable hydrogen gas. Small leakage may also be potentially difficult to detect without the use of costly and complex sensors. It is therefore a desire to increase the safety for vehicles operable by hydrogen gas.

SUMMARY

It is thus an object of the present disclosure to at least partially overcome the above-described deficiencies.

According to a first aspect, there is provided a gas consumer system for a vehicle, the gas consumer system being configured to generate power by consuming gas, the gas consumer system comprising a gas consumer comprising an inlet configured to receive a flow of gas, at least one gas tank, the gas tank comprising a gas tank outlet, a conduit connecting the gas tank outlet of the tank to the inlet of the gas consumer, and an elongated sleeve attached to the inlet of the gas consumer and to the gas tank outlet of the gas tank, wherein the conduit is housed within the elongated sleeve, the elongated sleeve comprising a sleeve outlet configured to convey leakage of gas between the gas consumer and the gas tank away from the gas consumer system.

The wording "gas consumer" should be construed as an arrangement consuming gas. The gas consumer may, as a non-limiting example, be a fuel cell receiving a flow of hydrogen gas for generating electric power. Thus, the fuel cell consumes hydrogen gas when generating electric power. As another non-limiting example, the gas consumer may be a gas consuming engine using gas for combustion. An example of such an engine is a hydrogen internal combustion engine where hydrogen gas is consumed when the hydrogen internal combustion engine generates a mechanical motion for propelling the vehicle. The gas consumer may also be an internal combustion engine.

The present disclosure is based on the insight that a small leakage of gas is difficult to detect during operation of the vehicle. By using an elongated sleeve to house the conduit between the gas tank and the gas consumer, potential leakage is collected in the elongated sleeve, thereby reducing the risk of obtaining accumulated amounts of ignitable gas in the compartment provided with the gas tank, the conduits and/or the gas consumer. Instead, the present disclosure efficiently directs the gas through the sleeve outlet to a position at which it is safer to expel the potential leakage. An advantage is thus that the risk of a potential accident caused by leakage gas is reduced.

According to an example embodiment, the gas consumer system may comprise a plurality of gas tanks, each gas tank having an individual gas tank outlet, wherein the conduit is connected between each gas tank outlet and the inlet of the gas consumer, wherein the conduit further extends between each of the plurality of gas tank outlets.

Hereby, leakage between the tanks can hereby also be collected in the elongated sleeve and thereafter directed through the sleeve outlet.

According to an example embodiment, the elongated sleeve may comprise an elongated portion extending in a direction away from the gas consumer and the gas tank, the sleeve outlet being arranged at an end position of the elongated portion. An advantage is that the potential leakage can be fed to a position relatively far away from the gas consumer and the gas tank. The elongated portion also enables the user of the gas consumer system to choose the position at which potential leakage should be directed.

According to an example embodiment, the end position of the elongated portion may be configured to be arranged above, or rearward of, a passenger compartment of the vehicle. This position is of particular advantage since an operator of the vehicle hereby can detect the leakage, while the position at the same is safer from an ignition point of view.

According to an example embodiment, each of the plurality of tanks may comprise a valve at the gas tank outlet. Furthermore, and according to an example embodiment, each of the valves may be housed within the elongated sleeve. The valves are advantageously provided for being able to control the flow of gas from the tanks to the gas consumer. However, a valve may be a potential leakage position as it is conventionally provided with sealings formed by sealing material that may become less efficient by age, and thus a potential position for leakage. Providing the elongated sleeve to also house the valves hereby prevents potentially undesired leakage.

According to an example embodiment, the gas consumer system may further comprise a gas sensor arranged in the elongated sleeve, the gas sensor being configured to detect the presence of leakage of gas in the elongated sleeve.

The use of a gas sensor in the elongated sleeve is particularly advantageous since the gas sensor can transmit a signal to e.g., the below described control unit upon detecting the presence of gas in the elongated sleeve, whereby the control unit can take a precautionary action. The operator of the vehicle can also be informed of the presence of a leakage. If the leakage is severe, the operator can decide to immediately stop the vehicle, and if the leakage is less severe, the operator can decide to drive the vehicle for maintenance. According to an example embodiment, the gas sensor may be positioned at the sleeve outlet.

According to an example embodiment, the gas consumer system may further comprise a control unit comprising processing circuitry operably connected to each of the valves, the processing circuitry being configured to receive a signal from the gas sensor, the signal being indicative of a level of leakage gas present in the elongated sleeve, compare the level of leakage gas with a predetermined threshold, and control the valves to assume a closed position in which gas is prevented from leaving the gas tanks when the level of leakage gas is above the predetermined threshold.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Hereby, gas can no longer be fed from the gas tanks to the gas consumer, whereby the damage can be substantially reduced.

According to an example embodiment, the processing circuitry may be further operatively connected to the gas consumer, the processing circuitry being configured to control the gas consumer to assume a non-power generating mode when the level of leakage gas is above the predetermined threshold.

Hence, the operation of the gas consumer is stopped upon a leakage detection. As described above, and according to an example embodiment, the gas consumer may be a fuel cell. In such a case, the operation of the fuel cell is turned off and the electric machine receives electric power solely from e.g., the vehicle batteries. If the vehicle is a hybrid vehicle operated by both an electric machine and an internal combustion engine, the vehicle can be propelled solely by the internal combustion engine until the leakage is stopped if a state of charge level of the batteries is too low.

According to an example embodiment, the processing circuitry may be connected to a human machine interface display, the processing circuitry being configured to transmit a signal indicative of gas leakage to the human machine interface display when the level of leakage gas is above the predetermined threshold. Accordingly, and as briefly described above, the operator is hereby informed of the leakage and can take a suitable action for further operation of the vehicle.

According to a second aspect, there is provided a method of controlling a gas consumer system, the gas consumer system comprising a gas consumer comprising an inlet configured to receive a flow of gas, at least one gas tank, the gas tank comprising a gas tank outlet provided with a valve, a conduit connecting the gas tank outlet of the gas tank to the inlet of the gas consumer, and an elongated sleeve attached to the inlet of the gas consumer and to the gas tank outlet, wherein the conduit is housed within the elongated sleeve, the elongated sleeve comprising a sleeve outlet configured to convey leakage of gas between the gas consumer and the gas tank away from the gas consumer system, the method comprising determining a level of leakage gas present in the elongated sleeve, and controlling the valve to assume a closed position in which gas is prevented from leaving the gas tank when the level of leakage gas is above a predetermined threshold.

Effects and features of the second aspect are largely analogous to those described above in relation to the first aspect.

According to a third aspect, there is provided a vehicle comprising an electric traction motor, an energy storage system configured to feed electric power to the electric traction motor during propulsion, and a gas consumer system according to any one of the embodiments described above in relation to the first aspect, wherein the gas consumer is electrically connected to the energy storage system and configured to feed electric power generated in the gas consumer to the energy storage system.

According to a fourth aspect, there is provided a computer program comprising program code means for performing the method of the second aspect when the program is run on a computer.

According to a fifth aspect, there is provided a non-transitory computer readable medium carrying a computer program comprising program code for performing the method of the second aspect when the program product is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
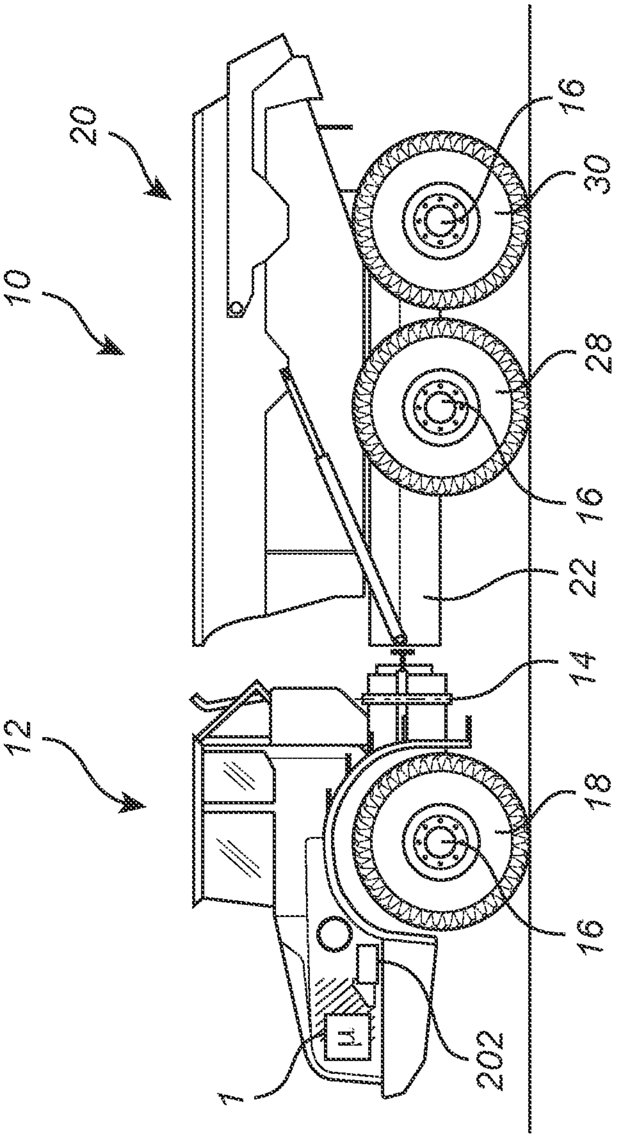
FIG. 1 is a lateral side view illustrating an example embodiment of a working machine in the form of an articulated hauler.

The present disclosure will now be described more fully hereinafter with reference to the accompanying drawings, in which exemplary embodiments are shown. The disclosed subject matter may, however, be embodied in many different forms and should not be construed as limited to the embodiments set forth herein; rather, these embodiments are provided for thoroughness and completeness. Like reference character refer to like elements throughout the description.

Reference is made to FIG. 1, which is a lateral side view illustrating a working machine according to an example embodiment. The FIG. 1 working machine 10 is exemplified as a frame-steered articulated hauler, also called dumper.

As can be seen from FIG. 1, the working machine 10 illustrated therein comprises a front working machine section 12 comprising a front frame 14 and a first wheel axle 16, also referred to as a front wheel axle 16, connected to a first pair of wheels 18, although only the left front wheel is visible in FIG. 1.

Moreover, as seen in FIG. 1, the working machine 10 comprises a rear working machine section 20 comprising a rear frame 22, a second wheel axle 24, also referred to as a front rear axle 24 and a third wheel axle 26, also referred to as a back rear axle 26. The front rear axle 24 is connected to a second pair of wheels 28 and the back rear axle 26 is connected to a third pair of wheels 30.

Although the FIG. 1 embodiment of the working machine 10 comprises two rear axles 24, 26, it is also envisaged that embodiments of the working machine may be equipped with only one rear axle (not shown). The working machine 10 further comprises a gas consumer system (exemplified in detail in FIGS. 2 and 3) comprising a gas consumer 202.

Moreover, the working machine 10 also comprises a control unit 1. The control unit 1 may form part of the below described gas consumer system for controlling operation thereof. Further, the control unit 1 comprises control circuitry which may include a microprocessor, microcontroller, programmable digital signal processor or another programmable device. The control circuitry may also, or instead, each include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device. It should be understood that all or some parts of the functionality provided by means of the control circuitry may be at least partly integrated with an upper layer vehicle control unit (not shown) of the working machine. Accordingly, the control unit 1 thus controls gear shifting of the below described transmission arrangements as well as operation of the electric machines. When controlling gear shifting, the control unit 1 may control operation of the various shift elements of the transmission arrangements.

Figure 2:
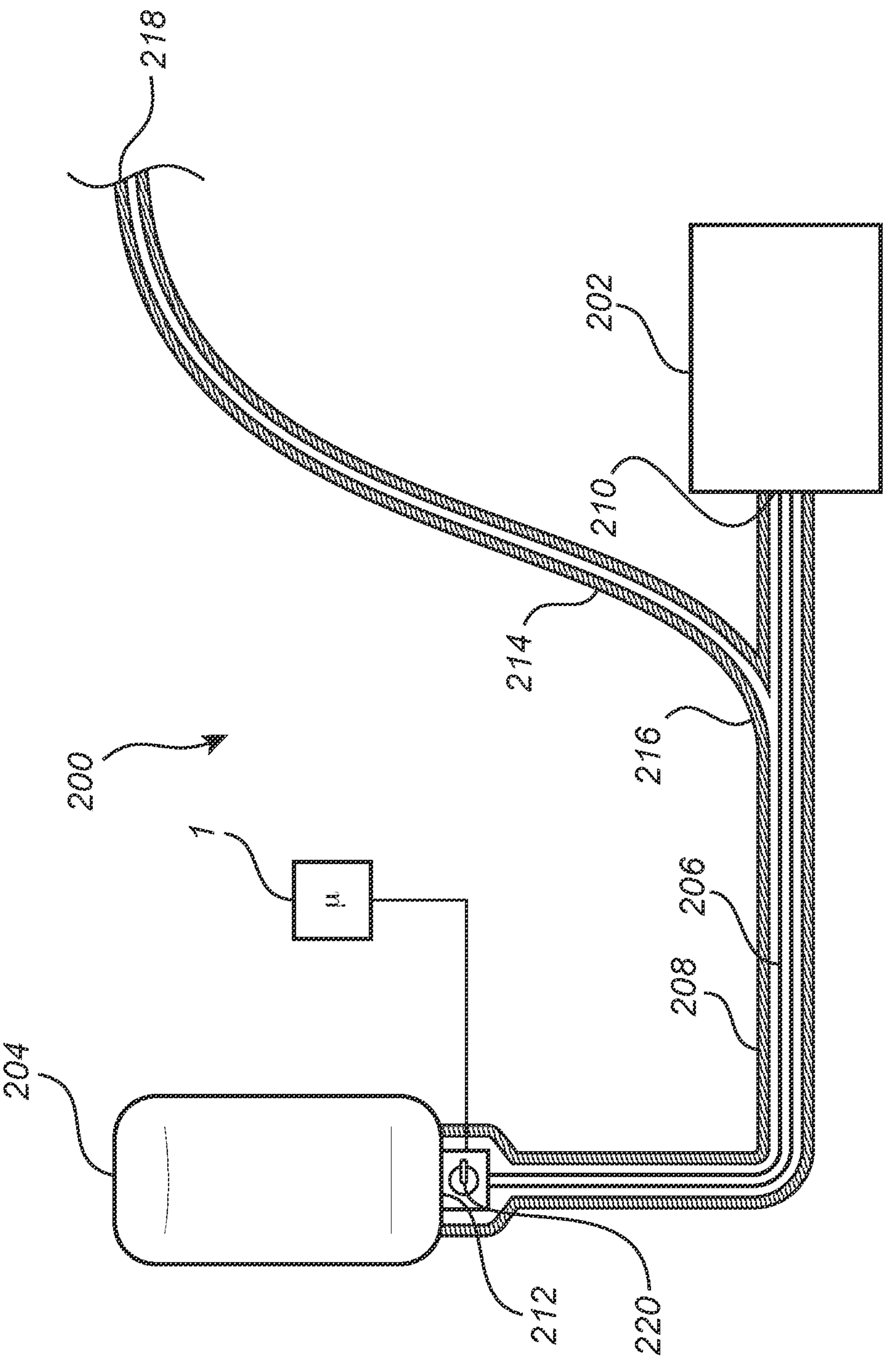
FIG. 2 is a schematic illustration of a gas consumer system according to an example embodiment.

In order to describe the gas consumer system in further detail, reference is made to FIG. 2 which is a schematic illustration of the gas consumer system 200 according to an example embodiment. As can be seen in FIG. 2, the gas consumer system 200 comprises a gas consumer 202. The gas consumer 202 is configured to receive a flow of gas from a gas tank 204. When receiving the flow of gas, the gas consumer 202 consumes the gas to generate power. The gas consumer 202 exemplified in FIG. 2 can be e.g., a hydrogen internal combustion engine receiving a flow of hydrogen gas from the gas tank 204. The hydrogen gas is thus combusted in the hydrogen internal combustion engine to generate a torque on e.g., a crank shaft, which torque is propelling the wheels of the working machine. As will be evident from the description below with reference to FIG. 3, the gas consumer 202 may alternatively be a fuel cell which operational functionalities are described in further detail below.

Moreover, the gas consumer system 200 also comprises a conduit 206 connecting the gas tank 204 and the gas consumer 202 to each other. Hence, the gas in the gas tank 204 is fed to the gas consumer 202 via the conduit 206. Also, the gas consumer system 200 further comprises an elongated sleeve 208. The elongated sleeve 208 is, as also depicted in detail in FIG. 2, housing the conduit 206. Thus, the conduit 206 is fully encapsulated inside the elongated sleeve 208. In addition, the elongated sleeve 208 is also attached to an inlet 210 of the gas consumer 202 as well as to a gas tank outlet 212 of the gas tank 204. Hereby, any gas leakage that might occur in the gas consumer system 200 will be collected inside the elongated sleeve 208.

Moreover, the elongated sleeve 208 also comprises an elongated portion 214. The elongated portion 214 extends from an intermediate position 216 of the elongated sleeve 208 to a sleeve outlet 218. The intermediate position 216 is arranged on the elongated sleeve 208 at a position between the gas tank 204 and the gas consumer 202. Potential leakage of gas is thus conveyed to the sleeve outlet 218 via the elongated portion 214. The position of the sleeve outlet 218 relative to the working machine 10 depends on the particular gas conveyed from the gas tank 204 to the gas consumer 202. As a non-limiting example, a heavy gas, i.e., a gas with relatively high density, may be vented downwards, while a light gas with a relatively low density may be vented upwards. In the latter case, and according to a non-limiting example, the elongated portion, and in turn the sleeve outlet 218 is arranged above and/or rearward of a passenger compartment of the working machine 10.

The elongated sleeve may be made from a material which is flexible and of low weight, i.e., the density of the elongated sleeve may be low. The elongated sleeve 208 must not be designed to withstand high pressure levels as its purpose is to merely convey leakage gas. Also, a lower weight of the elongated sleeve is beneficial as it will not substantially affect the overall weight of the working machine 10.

The gas consumer system 200 also comprises a valve 220. The valve 220 is arranged and connected to the gas tank outlet 212. The valve 220 may be controlled by means of control unit 1. Hence, the control unit 1 controls the valve 220 between an open position in which gas from the gas tank 204 is fed to the gas consumer 202, and a closed position in which gas is prevented from leaving the gas tank 204, i.e., prevented to reach the gas consumer 202. As depicted in FIG. 2, the valve 220 is housed within the elongated sleeve 208. Put it differently, the valve 220 as well as the conduit 206 are both housed within the elongated sleeve 208.

Figure 3:
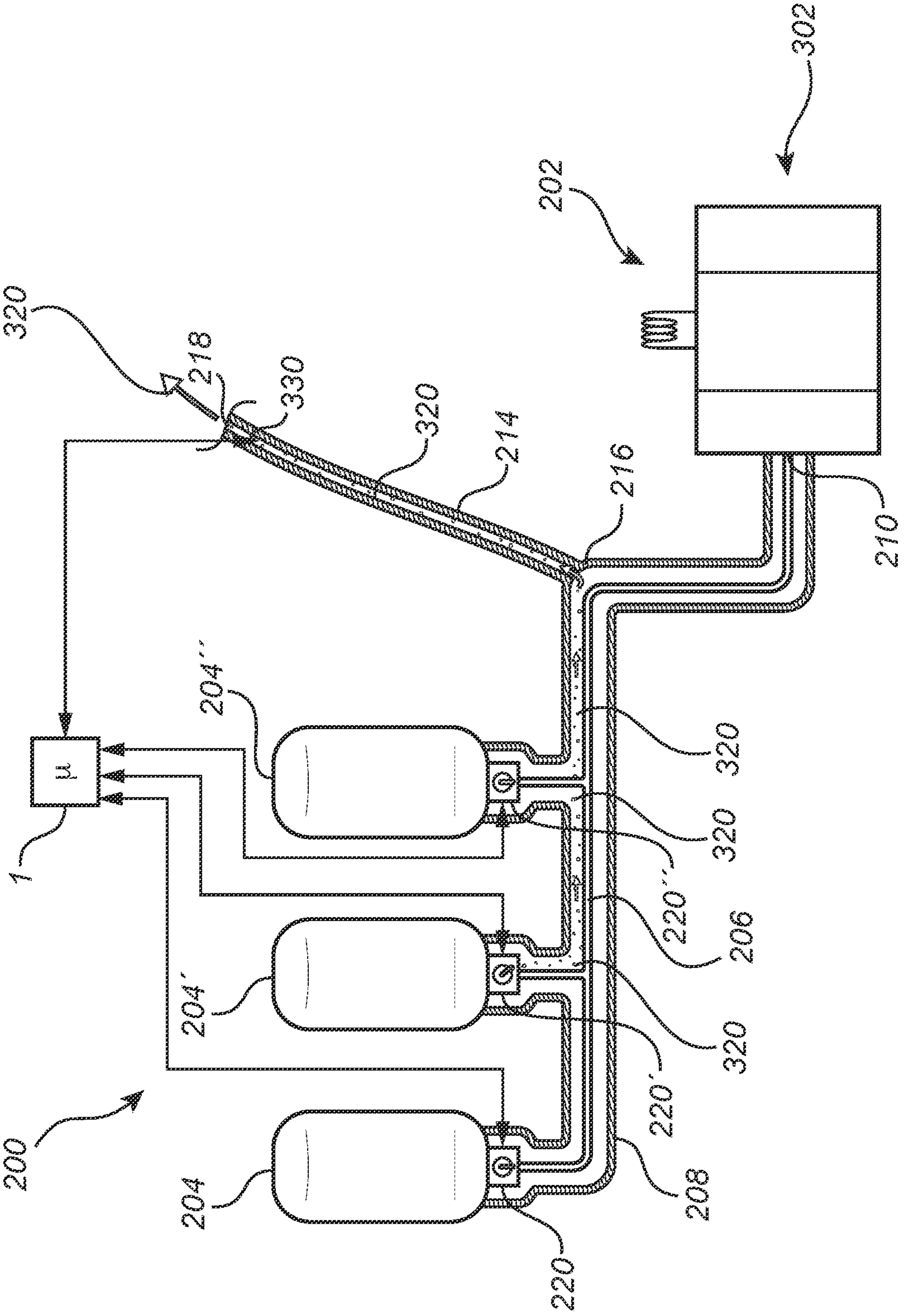
FIG. 3 is a schematic illustration of a gas consumer system according to another example embodiment.

In order to describe the gas consumer system 200 according to another example embodiment, reference is now made to FIG. 3. The exemplified gas consumer system 200 in FIG. 3 operates and comprises the same features as described above in relation to the embodiment depicted in FIG. 2, unless stated otherwise. Accordingly, features present in the FIG. 3 embodiment as well as in the FIG. 2 embodiment will not be described in the following.

In FIG. 3, the gas consumer 202 is exemplified as a fuel cell 302. The fuel cell 302 receives gas, such as hydrogen gas, from the gas tank 202. The gas is directed into the inlet 210 of the fuel cell 302, whereby a chemical reaction is formed together with air for generating electric power. The electric power is in turn fed to an electric traction motor or a battery of the working machine 10.

The gas consumer system 200 exemplified in FIG. 3 also, compared to the example depicted in FIG. 2, comprises a plurality of gas tanks 204, 204', 204". Each of the plurality of gas tanks 204, 204', 204" comprises a valve 220, 220', 220" connected in a similar manner as described above in relation to the FIG. 2 embodiment. Hence, the plurality of valves is all housed within the elongated sleeve 208. As can be seen in FIG. 3, a leakage of gas 320 occurs at one of the valves 220' connected to one of the gas tanks 204'. The leakage gas 320 is conveyed through the elongated sleeve 208, i.e., through the volume formed between the external surface of the conduit 206 and the internal surface of the elongated sleeve 208. At the above-described intermediate position 216, the leakage gas 320 is directed into the elongated portion 214 of the elongated sleeve 208. The leakage gas 320 is conveyed through the elongated portion 214 until reaching the sleeve outlet 218.

At the sleeve outlet 218, the gas consumer system 200 comprises a gas sensor 330. The gas sensor 330 is connected to the control unit 1 and configured to transmit a signal indicative of the presence of gas in the elongated sleeve 208 to the control unit 1. When the control unit 1 receives a signal indicating the presence of gas in the elongated sleeve 208, the control unit 1 can control each of the valves 220, 220', 220" to assume the closed position, in particular if the gas level is above a predetermined threshold limit. Hereby, the leakage may be potentially stopped, and the damage reduced.

As an alternative, or complement, the control unit 1 can also transmit a control signal to the gas consumer 202 to assume a non-power generating mode, i.e., to stop operation of the gas consumer 202.

It should be readily understood that the FIG. 2 example embodiment may also comprise the gas sensor 320 and the functionality to take action once detecting the presence of gas in the elongated sleeve, although the gas sensor and such functionalities are not described above or illustrated in FIG. 2.

Furthermore, upon detecting the presence of gas, the control unit 1, or processing circuitry of the control unit 1, can also transmit a signal to a human machine interface display (not shown) in the cabin compartment to inform the operator of a leakage. As an alternative, the detected leakage of gas can be transmitted via telematics/Bluetooth/Wi-Fi, etc. to a control station at a remote distance from the working machine, whereby a suitable action can be taken.

Figure 4:
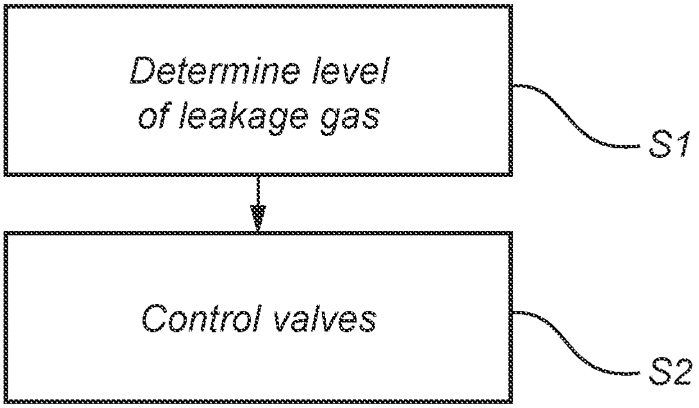
FIG. 4 is a flow chart of a method of controlling a gas consumer system according to an example embodiment.

In order to sum up, reference is made to FIG. 4 which is a flow chart of a method of controlling the above-described gas consumer system 200. During operation of the working machine 10, a level of leakage gas 320 in the elongated sleeve 208 is determined S1. This may be determined by the control unit 1 receiving a signal from the gas sensor 330. When the level of leakage gas 320 is above a predetermined threshold, the valve 220 is controlled S2 to assume a closed position in which gas is prevented from leaving the gas tank 204.

It is to be understood that the present disclosure is not limited to the embodiments described above and illustrated in the drawings; rather, the skilled person will recognize that many changes and modifications may be made within the scope of the appended claims.

The invention claimed is:

1. A gas consumer system for a vehicle, the gas consumer system being configured to generate power by consuming gas, the gas consumer system comprising:

a gas consumer comprising an inlet configured to receive a flow of gas, a plurality of gas tanks, each gas tank having an individual gas tank outlet, wherein each of the plurality of tanks comprises a valve at the gas tank outlet, a conduit connecting the gas tank outlet of the tank to the inlet of the gas consumer, wherein the conduit is connected between each gas tank outlet and the inlet of the gas consumer, wherein the conduit further extends between each of the plurality of gas tank outlets, and an elongated sleeve arranged between the gas consumer and the gas tank, the elongated sleeve being attached to the inlet of the gas consumer and to the gas tank outlet of the gas tank, wherein the conduit is housed within the elongated sleeve, the elongated sleeve comprising a sleeve outlet arranged between the gas consumer and the gas tank and configured to convey leakage of gas between the gas consumer and the gas tank away from the gas consumer system, wherein the gas consumer system further comprises a gas sensor arranged in the elongated sleeve, the gas sensor being configured to detect the presence of leakage of gas in the elongated sleeve, and a control unit comprising processing circuitry operably connected to each of the valves, the processing circuitry being configured to:

receive a signal from the gas sensor, the signal being indicative of a level of leakage gas present in the elongated sleeve, compare the level of leakage gas with a predetermined threshold, and control the valves to assume a closed position in which gas is prevented from leaving the gas tanks when the level of leakage gas is above the predetermined threshold, wherein the processing circuitry is further operatively connected to the gas consumer, the processing circuitry being configured to control the gas consumer to assume a non-power generating mode when the level of leakage gas is above the predetermined threshold.

2. The gas consumer system according to claim 1, wherein the elongated sleeve comprises an elongated portion extending in a direction away from the gas consumer and the gas tank, the sleeve outlet being arranged at an end position of the elongated portion.

3. The gas consumer system according to claim 2, wherein the end position of the elongated portion is configured to be arranged above, or rearward of, a passenger compartment of the vehicle.

4. The gas consumer system according to claim 1, wherein each of the valves are housed within the elongated sleeve.

5. The gas consumer system according to claim 1, wherein the gas consumer system further comprises a gas sensor arranged in the elongated sleeve, the gas sensor being configured to detect the presence of leakage of gas in the elongated sleeve.

6. The gas consumer system according to claim 5, wherein the gas sensor is positioned at the sleeve outlet.

7. The gas consumer system according to claim 1, wherein the processing circuitry is connected to a human machine interface display, the processing circuitry being configured to transmit a signal indicative of gas leakage to the human machine interface display when the level of leakage gas is above the predetermined threshold.

8. The gas consumer system according to claim 1, wherein the gas consumer is a fuel cell.

* * * * *